US012415907B2

(12) United States Patent
Yamagata et al.

(10) Patent No.: US 12,415,907 B2
(45) Date of Patent: Sep. 16, 2025

(54) RUBBER COMPOSITION AND RUN-FLAT TIRE

(71) Applicant: BRIDGESTONE CORPORATION, Tokyo (JP)

(72) Inventors: Chiyo Yamagata, Tokyo (JP); Shunsuke Saji, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 734 days.

(21) Appl. No.: 17/765,943

(22) PCT Filed: Oct. 1, 2020

(86) PCT No.: PCT/JP2020/037449
§ 371 (c)(1),
(2) Date: Apr. 1, 2022

(87) PCT Pub. No.: WO2021/066106
PCT Pub. Date: Apr. 8, 2021

(65) Prior Publication Data
US 2022/0348746 A1    Nov. 3, 2022

(30) Foreign Application Priority Data

Oct. 2, 2019   (JP) ................................ 2019-182505
Dec. 17, 2019  (JP) ................................ 2019-227431

(51) Int. Cl.
| | |
|---|---|
| *B60C 17/00* | (2006.01) |
| *B60C 15/06* | (2006.01) |
| *C08K 3/04* | (2006.01) |
| *C08K 5/40* | (2006.01) |
| *C08K 5/47* | (2006.01) |
| *C08L 7/00* | (2006.01) |
| *C08L 15/00* | (2006.01) |
| *B60C 1/00* | (2006.01) |
| *C08K 5/44* | (2006.01) |

(52) U.S. Cl.
CPC ............ *C08L 7/00* (2013.01); *B60C 15/0603* (2013.01); *B60C 17/0009* (2013.01); *C08K 3/04* (2013.01); *C08L 15/00* (2013.01); *B60C 2001/0033* (2013.01); *B60C 2001/005* (2013.01); *C08K 5/44* (2013.01); *C08K 2201/006* (2013.01); *C08L 2312/00* (2013.01)

(58) Field of Classification Search
None
See application file for complete search history.

(56) References Cited

U.S. PATENT DOCUMENTS

| | | | | |
|---|---|---|---|---|
| 2016/0082787 | A1* | 3/2016 | Boen | ...................... C08L 9/00 |
| | | | | 152/517 |
| 2019/0177515 | A1* | 6/2019 | Amiya | ................ B60C 17/0009 |
| 2019/0309145 | A1 | 10/2019 | Kubo | |
| 2021/0363333 | A1 | 11/2021 | Recker et al. | |
| 2022/0363093 | A1* | 11/2022 | Yamagata | ............... C08C 19/44 |

FOREIGN PATENT DOCUMENTS

| | | | |
|---|---|---|---|
| CN | 107722393 | * | 2/2018 |
| CN | 107722393 A | | 2/2018 |
| CN | 110050024 A | | 7/2019 |
| EP | 4 039 502 A1 | | 8/2022 |
| JP | 11-49897 A | | 2/1999 |
| JP | 11049897 | * | 2/1999 |
| JP | 2005-263916 A | | 9/2005 |
| JP | 2015-017160 A | | 1/2015 |
| JP | 2015017160 | * | 1/2015 |
| JP | 2016-069628 A | | 5/2016 |
| JP | 2017-075227 A | | 4/2017 |
| JP | 2019-104790 A | | 6/2019 |
| JP | 2019-524956 A | | 9/2019 |
| WO | 2016/143755 A1 | | 9/2016 |
| WO | 2016/143756 A1 | | 9/2016 |
| WO | 2016/143757 A1 | | 9/2016 |

OTHER PUBLICATIONS

Birla Carbon; Carbon Blacks for Rubber Applications;(2020) pp. 1-8. (Year: 2020).*
Tokai Carbon brochure (no date) pp. 1-6. (Year: 0000).*
Chinese Search Report dated Feb. 6, 2024 in Chinese Application No. 202080068989.3.
Extended European Search Report dated Oct. 4, 2022 in European Application No. 20873132.3.
Official communication issued Aug. 31, 2024 in Chinese Application on 202080068989.3.
International Search Report of PCT/JP2020/037449 dated Dec. 8, 2020 [PCT/ISA/210].

* cited by examiner

*Primary Examiner* — David J Buttner
(74) *Attorney, Agent, or Firm* — Sughrue Mion, PLLC

(57) ABSTRACT

The present invention provides a run-flat tire excellent in high-temperature softening inhibition, and a rubber composition from which the tire can be produced. The rubber composition contains a rubber component, a filler, a vulcanizing agent, and a vulcanization accelerator that contains a sulfenamide-based vulcanization accelerator and 1.0 to 2.0 parts by mass of tetrabenzylthiuramdisulfide based on 100 parts by mass of the rubber component, in which a mass ratio (a/b) of a content (a) of the tetrabenzylthiuramdisulfide to a content (b) of the sulfenamide-based vulcanization accelerator is 0.60 to 1.25.

12 Claims, 1 Drawing Sheet

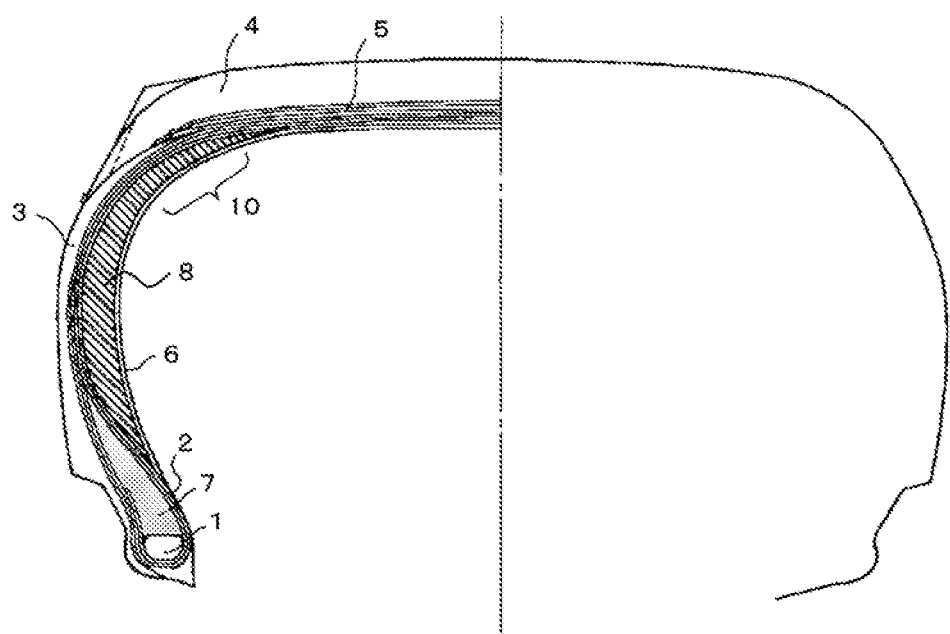

RUBBER COMPOSITION AND RUN-FLAT TIRE

CROSS REFERENCE TO RELATED APPLICATIONS

This application is a National Stage of International Application No. PCT/JP2020/037449 filed on Oct. 1, 2020, claiming priority based on Japanese Patent Application No. 2019-182505 filed on Oct. 2, 2019 and Japanese Patent Application No. 2019-227431 filed on Dec. 17, 2019.

TECHNICAL FIELD

The present invention relates to a rubber composition and a run-flat tire.

BACKGROUND ART

Heretofore, in tires, especially, in run-flat tires, a side-reinforcing layer formed of a rubber composition alone or a composite of a rubber composition and fibers is arranged for the purpose of enhancing the stiffness of the side wall part.

Regarding the run-flat tires, for example, disclosed is a method of producing a side-reinforcing rubber layer having a predetermined tensile strength by using a rubber composition, in order to enhance the run-flat durability. The rubber composition is obtained by blending a rubber component, a reinforcing filler, a thermosetting resin, a thiuram-based vulcanization accelerator, a vulcanization accelerator other than the thiuram-based vulcanization accelerator, and a sulfur-containing vulcanizing agent, in predetermined amounts, respectively (for example, see PTL 1 to 3).

Further, disclosed is a method of preparing a rubber composition by blending a rubber component containing polybutadiene containing highly crystalline syndiotactic polybutadiene, a thiuram-based vulcanization accelerator and a sulfenamide-based vulcanization accelerator in predetermined amounts from the viewpoint of enhancing the extrusion workability of the rubber composition while having both a high elastic modulus and a low-heat generation property suitable for run-flat running (for example, see PTL 4).

CITATION LIST

Patent Literature

PTL 1: WO 2016/14375
PTL 2: WO 2016/143756
PTL 3: WO 2016/143757
PTL 4: JP 2005-263916 A

SUMMARY OF INVENTION

Technical Problem

However, the tires obtained by the methods described in PTL 1 to 4 are required to be further improved in high-temperature softening inhibition of vulcanized rubber.

An object of the present invention is to provide a run-flat tire excellent in high-temperature softening inhibition, and a rubber composition from which the tire can be produced.

Solution to Problem

<1> A rubber composition that contains a rubber component, a filler, a vulcanizing agent, and a vulcanization accelerator that contains a sulfenamide-based vulcanization accelerator and 1.0 to 2.0 parts by mass of tetrabenzylthiuramdisulfide based on 100 parts by mass of the rubber component, in which a mass ratio (a/b) of a content (a) of the tetrabenzylthiuramdisulfide to a content (b) of the sulfenamide-based vulcanization accelerator is 0.60 to 1.25.

<2> In the rubber composition described in <1>, a mass ratio (a/c) of the content (a) of the tetrabenzylthiuramdisulfide to a content (c) of the vulcanizing agent is 0.22 to 0.32.

<3> In the rubber composition described in <1> or <2>, a total content of the vulcanization accelerator is smaller than a total content of the vulcanizing agent.

<4> In the rubber composition described in any one of <1> to <3>, a mass ratio (d/c) of a total content (d) of the vulcanization accelerator to a total content (c) of the vulcanizing agent is 0.55 to 0.99.

<5> In the rubber composition described in any one of <1> to <4>, the filler contains carbon black having a nitrogen adsorption specific surface area of 15 to 39 $m^2/g$.

<6> In the rubber composition described in any one of <1> to <5>, the filler contains carbon black having a DBP oil absorption amount of 120 to 180 mL/100 g.

<7> In the rubber composition described in any one of <1> to <6>, a total content of a softener and a thermosetting resin is 5 parts by mass or less based on 100 parts by mass of the rubber component.

<8> In the rubber composition described in any one of <1> to <7>, a total content of a softener and a thermosetting resin is 1 part by mass or less based on 100 parts by mass of the rubber component.

<9> A run-flat tire in which the rubber composition described in any one of <1> to <8> is used for at least one member selected from the group consisting of a side-reinforcing rubber layer and a bead filler.

Advantageous Effects of Invention

According to the present invention, it is possible to provide a run-flat tire excellent in high-temperature softening inhibition, and a rubber composition from which the tire can be produced.

BRIEF DESCRIPTION OF DRAWINGS

FIG. 1 is a schematic view illustrating a cross section of a run-flat tire according to an embodiment of the present invention.

DESCRIPTION OF EMBODIMENTS

Hereinafter, the present invention will be illustrated and described in detail on the basis of the embodiment thereof.

In the following description, the description of "A to B" indicating a numerical range represents a numerical range including A and B as end points, and represents "A or more and B or less" (in the case of A<B), or "B or more and A or less" (in the case of B<A).

Further, parts by mass and mass % are synonymous with parts by weight and weight %, respectively.

<Rubber Composition>

A rubber composition of the present invention contains a rubber component, a filler, a vulcanizing agent, and a vulcanization accelerator that contains a sulfenamide-based vulcanization accelerator and 1.0 to 2.0 parts by mass of tetrabenzylthiuramdisulfide based on 100 parts by mass of the rubber component, in which the mass ratio (a/b) of the content (a) of the tetrabenzylthiuramdisulfide to the content (b) of the sulfenamide-based vulcanization accelerator is 0.60 to 1.25.

Since the rubber composition of the present invention has the above-mentioned structure, a tire made of vulcanized rubber obtained from the rubber composition is excellent in high-temperature softening inhibition. The reason for this is not clear, but this is assumed to be caused by the following reasons.

In vulcanized rubber obtained by vulcanizing a rubber composition, a rubber component forms a three-dimensional network structure by sulfur cross-linking, and the heat resistance may be lowered depending on the bonding status in the network structure. When the air inside a tire is released due to tire puncture, the tire is bent and its temperature becomes high. Nevertheless, a run-flat tire supports the vehicle body and enables running. Further, in consideration of ride comfort, running performance, etc. even if the tire has stiffness at the time when softening is likely to occur at a high temperature (for example, 180° C.), it is desirable that the stiffness does not change before and after heat generation of the tire.

Although the tire described in PTL 1 to 3 has a high tensile stress at 180° C., the temperature dependence of the vulcanized rubber strength is not demonstrated, and it was not possible to sustain the strength of the tire before and after heat generation of the tire. In PTL 4, only the storage modulus E' of the vulcanized rubber at 100° C. has been verified. Even if the vulcanized rubber described in PTL 4 is applied to the run-flat tire, it is thought that it is difficult to maintain the stiffness at a high temperature such as 180° C.

Whereas since the rubber composition of the present invention contains tetrabenzylthiuramdisulfide and tetrabenzylthiuramdisulfide as the vulcanization accelerator in the above-mentioned range, it is thought that it is possible to form a network structure having a high proportion of monosulfide bonds and disulfide bonds. It is thought that this makes it possible to obtain vulcanized rubber that is hardly softened at a high temperature. Further, it is said that if the proportion of monosulfide bonds and disulfide bonds is high, the mechanical property of the vulcanized rubber is deteriorated. Whereas it is thought that in the vulcanized rubber obtained from the rubber composition of the present invention, the mechanical property is less deteriorated. Thus, it is thought that the strength of the vulcanized rubber is sustained from before heat generation to after heat generation until high temperature is reached.

As a result, it is thought that the tire obtained from the rubber composition of the present invention is excellent in the high-temperature softening inhibition.

Hereinafter, details of the rubber composition will be described.

[Rubber Component]

The rubber composition of the present invention contains a rubber component.

Examples of the rubber component include a dienic rubber and a non-dienic rubber.

The dienic rubber may be at least one selected from the group consisting of a natural rubber (NR) and a synthetic dienic rubber.

Specifically, examples of the synthetic dienic rubber include a polyisoprene rubber (IR), a polybutadiene rubber (BR), a styrene-butadiene copolymer rubber (SBR), a butadiene-isoprene copolymer rubber (BIR), a styrene-isoprene copolymer rubber (SIR), and a styrene-butadiene-isoprene copolymer rubber (SBIR).

As the dienic rubber, preferred are a natural rubber, a polyisoprene rubber, a styrene-butadiene copolymer rubber, a polybutadiene rubber, and an isobutylene isoprene rubber, and more preferred are a natural rubber and a polybutadiene rubber.

Examples of the non-dienic rubber include an ethylene propylene rubber (EPDM (also called EPM)), a maleic acid modified ethylene propylene rubber (M-EPM), a butyl rubber (IIR), a copolymer of isobutylene and aromatic vinyl or a dienic monomer, an acrylic rubber (ACM), and an ionomer.

As the rubber component, one type may be used alone, or two or more types may be mixed for use.

The rubber component may be modified or unmodified. When two or more types of rubber components are used, an unmodified rubber component and a modified rubber component may be mixed for use.

The rubber component may contain a dienic rubber or contain a non-dienic rubber, but preferably contains at least a dienic rubber, more preferably is composed of a dienic rubber from the viewpoint of obtaining vulcanized rubber having a network structure excellent in the softening resistance at a high temperature and the mechanical strength.

Further, as the dienic rubber, only one of a natural rubber and a synthetic dienic rubber may be used, or both may be used, but it is desirable that a natural rubber and a synthetic dienic rubber are used in combination from the viewpoint of enhancing rupture characteristics such as tensile strength and elongation at break.

From the viewpoint of suppressing heat generation of vulcanized rubber, it is desirable that the rubber component does not contain a styrene-butadiene copolymer rubber (the content in the rubber component is 0% by mass).

Therefore, from the viewpoint of enhancing the high-temperature softening inhibition of a tire and enhancing the low-heat generation property, the rubber component is preferably composed of a natural rubber, a polyisoprene rubber, a polybutadiene rubber, and an isobutylene isoprene rubber, more preferably composed of a natural rubber, a polyisoprene rubber, and a polybutadiene rubber, further preferably composed of a natural rubber and a polybutadiene rubber. As mentioned above, the rubber component may be modified or may be unmodified. For example, "composed of a natural rubber and a polybutadiene rubber" includes a mode in which an unmodified natural rubber and a modified polybutadiene rubber are used, and a mode in which a modified natural rubber and a modified polybutadiene rubber are used.

The ratio of the natural rubber in the rubber component is preferably 10% by mass or more, more preferably 20 to 80% by mass, from the viewpoint of further enhancing rupture characteristics such as tensile strength and elongation at break.

As the rubber component, it is preferable to use a modifying group-containing rubber (referred to as a modified rubber sometimes), and it is more preferable to use a modifying group-containing synthetic rubber from the viewpoint of enhancing the low-heat generation property of vulcanized rubber.

From the viewpoint of enhancing the reinforcing property of a side-reinforcing rubber layer, the rubber composition contains a filler. In order to enhance the interaction with the filler (especially, carbon black), it is desirable that the rubber component contains a modifying group-containing polybutadiene rubber (a modified polybutadiene rubber) as a modifying group-containing synthetic rubber.

As described below, the filler preferably contains at least carbon black, and the modified polybutadiene rubber is preferably a modified polybutadiene rubber having at least one functional group interacting with carbon black. The functional group interacting with carbon black is preferably a functional group having an affinity for carbon black, and is specifically preferably at least one selected from the group consisting of a tin-containing functional group, a silicon-containing functional group, and a nitrogen-containing functional group.

In the case where the modified polybutadiene rubber is a modified polybutadiene rubber having at least one functional group selected from the group consisting of a tin-containing functional group, a silicon-containing functional group, and a nitrogen-containing functional group, preferably, in the modified polybutadiene rubber, a tin-containing functional group, a silicon-containing functional group or a nitrogen-containing functional group is introduced through modification with a modifying agent such as a tin-containing compound, a silicon-containing compound or a nitrogen-containing compound.

In modifying a polymerization active site of a butadiene rubber with a modifying agent, the modifying agent to be used is preferably a nitrogen-containing compound, a silicon-containing compound or a tin-containing compound. In this case, through a modification reaction, a nitrogen-containing functional group, a silicon-containing functional group or a tin-containing functional group can be introduced.

Such a functional group for modification may exist in any of a polymerization starting terminal, a main chain, and a polymerization active terminal of polybutadiene.

The nitrogen-containing compound usable as the modifying agent preferably has a substituted or unsubstituted amino group, an amide group, an imino group, an imidazole group, a nitrile group or a pyridyl group. Examples of the nitrogen-containing compound appropriate for the modifying agent include isocyanate compounds such as diphenylmethane diisocyanate, crude MDI, trimethylhexamethylene diisocyanate, and tolylene diisocyanate; and 4-(dimethylamino)benzophenone, 4-(diethylaminokenzophenone, 4-dimethylaminobenzylideneaniline, 4-dimethylaminobenzylidenebutylamine, dimethyl imidazolidinone, and N-methylpyrrolidone hexamethylene imine.

Further, examples of the silicon-containing compound usable as the modifying agent include 3-glycidoxypropyltrimethoxysilane, 3-glycidoxypropyltriethoxysilane, N-(1-methylpropylidene)-3-(triethoxysilyl)-1-propaneamine, N-(1,3-dimethylbutylidene)-3-(triethoxysilyl)-1-propaneamine, N-(3-triethoxysilylpropyl)-4,5-dihydroimidazole, 3-methacryloyloxypropyltrimethoxysilane, 3-isocyanatopropyltriethoxysilane, 3-triethoxysilylpropylsuccinic anhydride, 3-(1-hexamethyleneimino)propyl(triethoxy)silane, (1-hexamethyleneimino)methyl(trimethoxy)silane, 3-diethylaminopropyl(triethoxy)silane, 3-dimethylaminopropyl(triethoxy)silane, 2-(trimethoxysilylethyl)pyridine, 2-(triethoxysilylethyl)pyridine, 2-cyanoethyltriethoxysilane, and tetraethoxysilane. As the silicon-containing compound, one type may be used alone, or two or more types may be used in combination. Further, partial condensates of the silicon-containing compound are also usable.

Further, as the modifying agent, also preferred is a modifying agent represented by the following formula (I):

$$R^1{}_a ZX_b \qquad (I)$$

wherein $R^1$ is each independently selected from the group consisting of an alkyl group having 1 to 20 carbon atoms, a cycloalkyl group having 3 to 20 carbon atoms, an aryl group having 6 to 20 carbon atoms, and an aralkyl group having 7 to 20 carbon atoms; Z represents tin or silicon; X each independently represents chlorine or bromine; a is 0 to 3, and b is 1 to 4, provided that a+b=4]. A modified polybutadiene rubber obtained through modification with a modifying agent of the formula (I) contains at least one tin-carbon bond or silicon-carbon bond.

Specifically, examples of $R^1$ in the formula (I) include a methyl group, an ethyl group, an n-butyl group, a neophyl group, a cyclohexyl group, an n-octyl group, and a 2-ethylhexyl group. Further, specifically, as the modifying agent of the formula (I), $SnCl_4$, $R'SnCl_3$, $R^1{}_2SnCl_2$, $R^1{}_3SnCl$, $SiCl_4$, $R^1SiCl_3$, $R^1{}_2SiCl_2$, and $R^1{}_3SiCl$ are preferred, and $SnCl_4$ and $SiCl_4$ are particularly preferred.

Among the above, the modified polybutadiene rubber is preferably a modified polybutadiene rubber having a nitrogen-containing functional group, more preferably an amine-modified polybutadiene rubber from the viewpoint of reducing the heat generation of vulcanized rubber, and extending the durable life.

(Modifying Group of Amine-Modified Polybutadiene Rubber)

In the amine-modified polybutadiene rubber, an amine-based functional group for modification is preferably a primary amino group or a secondary amino group. More preferably, a primary amino group protected with an eliminable group or a secondary amino group protected with an eliminable group is introduced, and further preferably, in addition to such an amino group, a silicon atom-containing functional group is introduced.

Examples of the primary amino group protected with an eliminable group (also referred to as a protected primary amino group) include an N,N-bis(trimethylsilyl)amino group, and examples of the secondary amino group protected with an eliminable group include an N,N-(trimethylsilyl)alkylamino group. The N,N-(trimethylsilyl)alkylamino group-containing group may be either an acyclic residue or a cyclic residue.

Among the amine-modified polybutadiene rubbers, a primary amine-modified polybutadiene rubber modified with a protected primary amino group is more preferred.

Examples of the silicon atom-containing functional group include a hydrocarbyloxysilyl group and/or a silanol group in which a hydrocarbyloxy group and/or a hydroxy group is bonded to a silicon atom.

Such a functional group for modification has an amino group protected with an eliminable group, and one or more silicon atoms (for example, one or two) to which a hydrocarbyloxy group or a hydroxy group is bonded, preferably at the polymerization terminal of a butadiene rubber, more preferably at the same polymerization active terminal thereof.

In modifying the active terminal of a butadiene rubber through reaction with protected primary amine, preferably, at least 10% of polymer chains in the butadiene rubber have a living property or a pseudo living property. Examples of a polymerization reaction having such a living property include an anionic polymerization reaction of a conjugated diene compound alone or a conjugated diene compound and an aromatic vinyl compound in an organic solvent using an organic alkali metal compound as an initiator, or a coordinate anionic polymerization reaction of a conjugated diene compound alone or a conjugated diene compound and an aromatic vinyl compound in the presence of a catalyst containing a lanthanum-series rare earth element compound in an organic solvent. As compared to the later, the former is preferred because one having a high vinyl bond content in the conjugated diene moiety can be obtained. By increasing the vinyl bond content, the heat resistance of vulcanized rubber can be enhanced.

(Polymerization Initiator)

The organic alkali metal compound usable as the initiator for anionic polymerization is preferably an organic lithium compound. Though not particularly limited thereto, a hydrocarbyl lithium and a lithium amide compound are preferably used as the organic lithium compound. In the case where the former hydrocarbyl lithium is used, a butadiene rubber which has a hydrocarbyl group at the polymerization starting terminal and in which the other terminal is a polymerization active site is obtained. Further, in the case where the latter lithium amide compound is used, a butadiene rubber which has a nitrogen-containing group at the polymerization starting terminal and in which the other terminal is a polymerization active site is obtained.

The hydrocarbyl lithium is preferably one having a hydrocarbyl group having 2 to 20 carbon atoms, and examples thereof include ethyl lithium, n-propyl lithium, isopropyl lithium, n-butyl lithium, sec-butyl lithium, tert-octyl lithium, n-decyl lithium, phenyl lithium, 2-naphthyl lithium, 2-butylphenyl lithium, 4-phenylbutyl lithium, cyclohexyl lithium, cyclopentyl lithium, and a reaction product of diisoprophenyl benzene and butyllithium. Among these, in particular, n-butyl lithium is preferred.

Meanwhile, examples of the lithium amide compound include lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithiumdi-2-ethylhexylamide, lithium didecylamide, lithium-N-methylpiperazide, lithium ethylpropylamide, lithium ethylbutylamide, lithium ethylbenzylamide, and lithium methylphenethylamide. Among these, from the viewpoint of the interaction effect with carbon black and the polymerization initiation performance thereof, preferred are cyclic lithium amides such as lithium hexamethyleneimide, lithium pyrrolidide, lithium piperidide, lithium heptamethyleneimide, and lithium dodecamethyleneimide, and especially preferred are lithium hexamethyleneimide and lithium pyrrolidide.

Regarding these lithium amide compounds, in general, those previously prepared from secondary amine and a lithium compound can be used for polymerization, but such compounds can also be prepared in a polymerization system (in-Situ). Further, the amount of the polymerization initiator to be used is preferably selected within a range of 0.2 to 20 mmol per 100 g of monomer.

The method of producing a butadiene rubber according to anionic polymerization using the organic lithium compound as the polymerization initiator is not particularly limited, for which any conventionally known method is employable.

Specifically, in an organic solvent inert to reaction, for example, in a hydrocarbon solvent such as an aliphatic, alicyclic, and aromatic hydrocarbon compound, a conjugated diene compound or a conjugated diene compound and an aromatic vinyl compound is/are subjected to anionic polymerization using the lithium compound as the polymerization initiator, in the presence of a randomizer to be used if desired, to give a butadiene rubber having an intended active terminal.

Further, in the case where the organic lithium compound is used as the polymerization initiator, not only a butadiene rubber having an active terminal, but also a copolymer of a conjugated diene compound and an aromatic vinyl compound having an active terminal can also be efficiently obtained, as compared to in a case where a catalyst containing the above-described lanthanum-series rare earth element compound is used.

The hydrocarbon solvent is preferably one having 3 to 8 carbon atoms, and examples thereof include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, and ethylbenzene. Among these, one may be used alone, or two or more types may be mixed for use.

Further, the monomer concentration in the solvent is preferably 5 to 50% by mass, more preferably 10 to 30% by mass. In the case where a conjugated diene compound and an aromatic vinyl compound are used for performing copolymerization, the content of the aromatic vinyl compound in the charged monomer mixture preferably falls in a range of 55% by mass or less.

(Modifying Agent)

In the present invention, in the butadiene rubber having the active terminal obtained as described above, the active terminal can be reacted with a protected primary amine compound as a modifying agent to produce a primary amine-modified polybutadiene rubber, and can be reacted with a protected secondary amine compound to produce a secondary amine-modified polybutadiene rubber. The protected primary amine compound is preferably an alkoxysilane compound having a protected primary amino group, and the protected secondary amine compound is preferably an alkoxysilane compound having a protected secondary amino group.

Examples of the alkoxysilane compound having a protected primary amino group that is used as a modifying agent for obtaining the amine-modified polybutadiene rubber include N,N-bis(trimethylsilyl)aminopropylmethyl dimethoxysilane, 1-trimethylsilyl-2,2-dimethoxy-1-aza-2-silacyclopentane, N,N-bis(trimethylsilyl)aminopropyl trimethoxysilane, N,N-bis(trimethylsilyl)aminopropyl triethoxysilane, N,N-bis(trimethylsilyl)aminopropylmethyl diethoxysilane, N,N-bis(trimethylsilyl)aminoethyl trimethoxysilane, N,N-bis(trimethylsilyl)aminoethyl triethoxysilane, N,N-bis(trimethylsilyl)aminoethylmethyl dimethoxysilane and N,N-bis(trimethylsilyl)aminoethylmethyl diethoxysilane. Preferred is N,N-bis(trimethylsilyl) aminopropylmethyl dimethoxysilane, N,N-bis(trimethylsilyl)aminopropylmethyl diethoxysilane or 1-trimethylsilyl-2, 2-dimethoxy-1-aza-2-silacyclopentane.

Further, examples of the modifying agent for obtaining the amine-modified polybutadiene rubber also include an alkoxysilane compound having a protected secondary amino group such as N-methyl-N-trimethylsilyl aminopropyl(methyl)dimethoxysilane, N-methyl-N-trimethylsilyl aminopropyl(methyl)diethoxysilane, N-trimethylsilyl(hexamethyleneimine-2-yl)propyl(methyl)dimethoxysilane, N-trimethylsilyl(hexamethyleneimine-2-yl)propyl(methyl) diethoxysilane, N-trimethylsilyl(pyrrolidine-2-yl)propyl (methyl)dimethoxysilane, N-trimethylsilyl(pyrrolidine-2-yl) propyl(methyl)diethoxysilane, N-trimethylsilyl(piperidine-2-yl)propyl(methyl)dimethoxysilane, N-trimethylsilyl (piperidine-2-yl)propyl(methyl) diethoxysilane, N-trimethylsilyl(imidazole-2-yl)propyl(methyl)dimethoxysilane, N-trimethylsilyl(imidazole-2-yl)propyl(methypdiethoxysilane, N-trimethylsilyl(4,5-dihydroimidazole-5-yl) propyl(methypdimethoxysilane, and N-trimethylsilyl(4,5-dihydroimidazole-5-yl)propyl(methyl)diethoxysilane; an alkoxysilane compound having an imino group such as N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, and N-(cyclohexylidene)-3-(triethoxysilyl)-1-propaneamine; and an alkoxysilane compound having an amino group such as 3-dimethylaminopropyl(triethoxy)silane, 3-dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane, and 3-dibutylaminopropyl(triethoxy) silane.

As these modifying agents, one type may be used alone, or two or more types may be used in combination. Further, the modifying agent may be a partial condensate.

Here, the partial condensate means a modifying agent where a part (but not all) of SiOR (R is an alkyl group or the like) is condensed in the form of an SiOSi bond.

In the modification reaction with the modifying agent, the amount of the modifying agent to be used is preferably 0.5 to 200 mmol/kg butadiene rubber. The amount is more preferably 1 to 100 mmol/kg butadiene rubber, particularly preferably 2 to 50 mmol/kg butadiene rubber. Here, the butadiene rubber means the mass of butadiene rubber not containing additives such as an antiaging agent to be added at the time of production or after production. When the amount of the modifying agent to be used is set within the above-mentioned range, the dispersibility of filler, especially, carbon black, is excellent, and the fracture resistance property and the low-heat generation property of vulcanized rubber are improved.

A method of adding the modifying agent is not particularly limited, and examples thereof include a method of collective addition, a method of divided addition, or a method of continuous addition, but a collective addition method is preferred.

Further, the modifying agent may be bonded not only to the polymerization starting terminal or the polymerization ending terminal but also to any of the polymer main chain or the side chain, but is preferably introduced into the polymerization starting terminal or the polymerization ending terminal from the viewpoint of suppressing energy dissipation from the polymer terminal to improve the low-heat generation property.

(Condensation Accelerator)

In the present invention, preferably, a condensation accelerator is used for accelerating the condensation reaction in which the protected primary amino group-containing alkoxysilane compound used as a modifying agent is involved.

As such a condensation accelerator, usable is a compound containing a tertiary amino group, or an organic compound containing one or more types of elements belonging to any of Group 3, Group 4, Group 5, Group 12, Group 13, Group 14 and Group 15 of the Periodic Table (the long period form). Further, as such a condensation accelerator, preferred are alkoxydes, carboxylates, or acetylacetonate complex salts containing at least one or more metals selected from the group consisting of titanium (Ti), zirconium (Zr), bismuth (Bi), aluminum (Al), and tin (Sn).

The condensation accelerator to be used herein may be added before the modification reaction but is preferably added to the modification reaction system during the modification reaction and/or after the end of the modification reaction. In the case of addition prior to the modification reaction, a direct reaction with the active terminal may occur so that a hydrocarbyloxy group having a protected primary amino group may not be introduced into the active terminal in some cases.

The time of addition of the condensation accelerator is generally in 5 min to 5 h after the start of modification reaction, preferably in 15 min to 1 h after the start of modification reaction.

Specifically, examples of the condensation accelerator include titanium-containing compounds such as tetramethoxy titanium, tetraethoxy titanium, tetra-n-propoxy titanium, tetraisopropoxy titanium, tetra-n-butoxy titanium, tetra-n-butoxy titanium oligomer, tetra-sec-butoxy titanium, tetra-tert-butoxy titanium, tetra(2-ethylhexyl)titanium, bis(octanedioleate)bis(2-ethylhexyl)titanium, tetra(octanedioleate)titanium, titanium lactate, titanium dipropoxy-bis(triethanolaminate), titanium dibutoxybis(triethanolaminate), titanium tributoxystearate, titanium tripropoxystearate, titanium ethylhexyldioleate, titanium tripropoxyacetyl acetonate, titanium dipropoxybis(acetylacetonate), titanium tripropoxyethyl acetoacetate, titanium propoxyacetylacetonatebis(ethylacetoacetate), titanium tributoxyacetyl acetonate, titanium dibutoxybis(acetylacetonate), titanium tributoxyethyl acetoacetate, titanium butoxyacetylacetonatebis(ethylacetoacetate), titanium tetrakis(acetylacetonate), titanium diacetylacetonatebis(ethylacetoacetate), bis(2-ethylhexanoate)titanium oxide, bis(laurate)titanium oxide, bis(naphthenate)titanium oxide, bis(stearate)titanium oxide, bis(oleate)titanium oxide, bis(linoleate)titanium oxide, tetrakis(2-ethylhexanoate)titanium, tetrakis(laurate)titanium, tetrakis(naphthenate)titanium, tetrakis(stearate)titanium, tetrakis(oleate)titanium, tetrakis(linoleate)titanium, and tetrakis (2-ethyl-1,3-hexanedioleate)titanium.

Further, examples thereof include bismuth or zirconium-containing compounds such as tris(2-ethylhexanoate)bismuth, tris(laurate)bismuth, tris(naphthenate)bismuth, tris(stearate)bismuth, tris(oleate)bismuth, tris(linoleate)bismuth, tetraethoxy zirconium, tetra-n-propoxy zirconium, tetraisopropoxy zirconium, tetra-n-butoxy zirconium, tetra-sec-butoxy zirconium, tetra-tert-butoxy zirconium, tetra(2-ethylhexyl)zirconium, zirconium tributoxystearate, zirconium tributoxyacetylacetonate, zirconium dibutoxybis(acetylacetonate), zirconium tributoxyethylacetoacetate, zirconium butoxyacetylacetonatebis(ethylacetoacetate), zirconium tetrakis(acetylacetonate), zirconium diacetylacetonatebis(ethylacetoacetate), bis(2-ethylhexanoate)zirconium oxide, bis(laurate)zirconium oxide, bis(naphthenate)zirconium oxide, bis(stearate)zirconium oxide, bis(oleate)zirconium oxide, bis(linoleate)zirconium oxide, tetrakis(2-ethylhexanoate)zirconium, tetrakis(laurate)zirconium, tetrakis(naphthenate)zirconium, tetrakis(stearate)zirconium, tetrakis(oleate)zirconium, and tetrakis(linoleate)zirconium.

Further, examples thereof include aluminum-containing compounds such as triethoxy aluminum, tri-n-propoxy aluminum, triisopropoxy aluminum, tri-n-butoxy aluminum, tri-sec-butoxy aluminum, tri-tert-butoxy aluminum, tri(2-1ethylhexyl)aluminum, aluminum dibutoxystearate, aluminum dibutoxyacetylacetonate, aluminum butoxybis(acetylacetonate), aluminum dibutoxyethylacetoacetate, aluminum tris(acetylacetonate), aluminum tris(ethylacetoacetate), tris(2-ethylhexanoate)aluminum, tris(laurate)aluminum, tris(naphthenate)aluminum, tris(stearate)aluminum, tris(oleate)aluminum, and tris(linoleate)aluminum.

Among the above-mentioned condensation accelerators, titanium compounds are preferred, and titanium metal alkoxides, titanium metal carboxylates, or titanium metal acetylacetonate complex salts are especially preferred.

The amount of the condensation accelerator to be used, the number of moles of the compound is preferably 0.1 to 10, particularly preferably 0.5 to 5 in a molar ratio to the total amount of the hydrocarbyloxy group present within the reaction system. When the amount of the condensation accelerator is set within the above-mentioned range, the condensation reaction is efficiently progressed.

The condensation reaction time is generally 5 min to 10 h, preferably about 15 min to 5 h. When the condensation reaction time is set within the above-mentioned range, the condensation reaction can be smoothly completed.

Further, the pressure in the reaction system at the time of condensation reaction is generally 0.01 to 20 MPa, preferably 0.05 to 10 MPa.

From the viewpoint of enhancing the low-heat generation property and the high temperature softening resistance of vulcanized rubber, the content of the modified rubber in the rubber component is preferably 10 to 90% by mass, more preferably 20 to 80% by mass.

[Filler]

The rubber composition of the present invention contains a filler from the viewpoint of increasing the stiffness of vulcanized rubber and obtaining softening resistance at a high temperature.

Examples of the filler include metal oxides such as alumina, titania, and silica, and reinforcing fillers such as clay, calcium carbonate and carbon black, and silica and carbon black are preferably used. It is desirable to use a filler having a low-heat generation property from the viewpoint of suppressing the heat generation of vulcanized rubber even if the air inside a tire is released, a side-reinforcing rubber layer, a bead filler, and the like are bent, and the vulcanized rubber constituting these parts generates heat.

(Carbon Black)

When the rubber composition contains carbon black, the strength of vulcanized rubber can be enhanced.

Further, from the viewpoint of enhancing the low-heat generation property of vulcanized rubber, the carbon black preferably has a nitrogen adsorption specific surface area ($N_2SA$) of 15 to 39 $m^2/g$. In the present specification, carbon black having a nitrogen adsorption specific surface area of 39 $m^2/g$ or less is referred to as carbon black having a large particle size.

When the nitrogen adsorption specific surface area is 39 $m^2/g$ or less, it is possible to suppress the heat generation of vulcanized rubber by suppressing heat generation caused by carbon black. When the nitrogen adsorption specific surface area is 15 $m^2/g$ or more, it is possible to enhance the reinforcing property of vulcanized rubber. The nitrogen adsorption specific surface area of carbon black is more preferably 18 to 37 $m^2/g$, further preferably 21 to 35 $m^2/g$ from the viewpoint of enhancing the low-heat generation property and the reinforcing property of vulcanized rubber and enhancing the high-temperature softening inhibition of a tire.

Further, the DBP oil absorption amount (dibutyl phthalate oil absorption amount) of carbon black may be preferably 120 to 180 mL/100 g.

The DBP oil absorption amount is used as an index indicating the degree of development of the aggregate structure of carbon black (referred to as "structure" sometimes), and there is a tendency that the larger the DBP oil absorption amount, the larger the aggregate. In the present specification, carbon black having a DBP oil absorption amount of 120 mL/100 g or more is called high-structured carbon black.

When the DBP oil absorption amount is 120 mL/100 g or more, it is possible to enhance the tensile strength and the compression resistance of vulcanized rubber, and to enhance the high-temperature softening inhibition of a tire. When the DBP oil absorption amount is 180 mL/100 g or less, it is possible to suppress the heat generation and to enhance the high-temperature softening inhibition.

The DBP oil absorption amount of carbon black is more preferably 122 to 170 mL/100 g, further preferably 125 to 165 mL/100 g.

It is desirable that the rubber composition of the present invention contains high-structured carbon black having a large particle size. In general, the structure of carbon black is lowered as the particle size increases. However, by using high-structure carbon black even with a large particle size, it is possible to further suppress heat generation and to further enhance the tensile strength and the compressive strength. Thus, it is possible to further enhance the softening resistance of a run-flat tire at a high temperature.

Specifically, it is desirable that the rubber composition of the present invention contains carbon black having a nitrogen adsorption specific surface area of 15 to 39 $m^2/g$ and a DBP oil absorption amount of 120 to 180 mL/100 g.

The carbon black preferably has a toluene coloring transmission of 50% or more.

When the toluene coloring transmission is 50% or more, the tar content present on the surface of carbon black, especially, the aromatic component is suppressed, and the rubber component can be sufficiently reinforced. Then, the wear resistance or the like of vulcanized rubber can be enhanced. The toluene coloring transmission of carbon black is more preferably 60% or more, further preferably 75% or more. The toluene coloring transmission of carbon black may be 100% but is generally less than 100%.

The toluene coloring transmission is measured by the method described in Section 8B of JIS K 6218:1997, and is denoted by a percentage based on pure toluene.

The content of carbon black in the rubber composition is preferably 30 to 100 parts by mass based on 100 parts by mass of the rubber component from the viewpoint of further enhancing the softening resistance of vulcanized rubber at a high temperature, and thereby further enhancing the run-flat durability, more preferably 35 to 80 parts by mass, further preferably 40 to 70 parts by mass.

(Silica)

Silica is not particularly limited, and examples thereof include wet method silica (hydrous silicic acid), dry method silica (anhydrous silicic acid), and colloidal silica. Silica may be a commercially available product, and for example, NIPSIL AQ (product name) of Tosoh silica Corporation, Zeosil 1115MP (product name) of Rhodia, and VN-3 (product name) of Evonik Degussa are available.

Further, when silica is used as a filler, the rubber composition may further contain a silane coupling agent in order to strengthen the bond between the silica and the rubber component and increase the reinforcing property, and thereby to enhance the dispersibility of silica in the rubber composition As the filler, one type may be used alone, or two or more types may be mixed for use. Further, the filler may contain either one of carbon black and silica, or may contain both, but preferably at least carbon black is contained, and more preferably one type of carbon black is used alone or two or more types are mixed for use.

The content (the total amount) of the filler in the rubber composition of the present invention is preferably 30 to 100 parts by mass based on 100 parts by mass of the rubber component, preferably 30 to 100 parts by mass, more preferably 35 to 80 parts by mass, further preferably 40 to 70 parts by mass from the viewpoint of further enhancing the softening resistance of vulcanized rubber at a high temperature, and thereby further enhancing the run-flat durability.

[Vulcanizing Agent]

The rubber composition of the present invention contains a vulcanizing agent.

The vulcanizing agent is not particularly limited, and in general, sulfur is used. Examples thereof include powdered sulfur, precipitated sulfur, colloidal sulfur, surface-treated sulfur, and insoluble sulfur.

The content of the vulcanizing agent in the rubber composition is preferably 2 to 12 parts by mass based on 100 parts by mass of the rubber component. When the content is 2 parts by mass or more, vulcanization can be sufficiently progressed, and when the content is 12 parts by mass or less, the aging resistance of vulcanized rubber can be suppressed.

The content of the vulcanizing agent in the rubber composition is more preferably 3 to 10 parts by mass based on 100 parts by mass of the rubber component, further preferably 4 to 8 parts by mass.

[Vulcanization Accelerator]

The rubber composition contains a sulfenamide-based vulcanization accelerator and tetrabenzylthiuramdisulfide as a vulcanization accelerator. Here, the content of tetrabenzylthiuramdisulfide in the rubber composition is 1.0 to 2.0 parts by mass based on 100 parts by mass of the rubber component, and the mass ratio (a/b) of the content (a) of the tetrabenzylthiuramdisulfide to the content (b) of the sulfenamide-based vulcanization accelerator is 0.60 to 1.25.

When the rubber composition of the present invention contains, as a vulcanization accelerator, the sulfenamide-based vulcanization accelerator and the tetrabenzylthiuramdisulfide in above amounts, it is thought that a run-flat tire obtained from the rubber composition of the present invention is excellent in the high-temperature softening inhibition, and as a result, excellent in the run-flat durability. It is thought that this is because by using a vulcanization accelerator at the composition, in vulcanized rubber, a network structure having a large proportion of monosulfide bonds and disulfide bonds is formed. Then, the softening resistance of the vulcanized rubber at a high temperature becomes excellent, and the stiffness can be maintained even if the vulcanized rubber is compressed or pulled at a high temperature.

When the content (a) of the tetrabenzylthiuramdisulfide in the rubber composition is less than 1.0 parts by mass based on 100 parts by mass of the rubber component, a sufficient high-temperature softening inhibition cannot be obtained, and when the content (a) is greater than 2.0 parts by mass, burning of rubber is likely to occur, and the mechanical strength of vulcanized rubber is lowered.

From the viewpoint of further enhancing the high-temperature softening inhibition of a tire, the content (a) is preferably 1.2 to 1.8 parts by mass, more preferably 1.3 to 1.7 parts by mass.

Further, when the mass ratio (a/b) of the content (a) of the tetrabenzylthiuramdisulfide to the content (b) of the sulfenamide-based vulcanization accelerator is less than 0.60, the softening resistance of vulcanized rubber at a high temperature is not obtained, and thus run-flat durability is not obtained. Further, when the mass ratio (a/b) is greater than 1.25, the rupture characteristics are degraded.

From the viewpoint of further enhancing the high-temperature softening inhibition of a tire, the mass ratio (a/b) is preferably 0.62 to 1.22, more preferably 0.64 to 1.20.

Further, the mass ratio (a/c) of the content (a) of the tetrabenzylthiuramdisulfide to the content (c) of the vulcanizing agent is preferably 0.22 to 0.32.

When the mass ratio (a/c) falls within the above-mentioned range, vulcanized rubber is excellent in the softening resistance at a high temperature, and thus the run-flat durability is excellent.

The mass ratio (a/c) is more preferably 0.25 to 0.32, further preferably 0.27 to 0.32.

Further, in the rubber composition of the present invention, it is desirable that the total content of the vulcanization accelerator is smaller than the total content of the vulcanizing agent. More specifically, it is desirable that the mass ratio (d/c) of the total content (d) of the vulcanization accelerator to the total content (c) of the vulcanizing agent is 0.55 to 0.99.

In general, in order to increase the proportion of monosulfide bonds and disulfide bonds in the network structure of vulcanized rubber, the total content of the vulcanization accelerator is made higher than the total content of the vulcanizing agent. On the contrary, in the present invention, it is desirable that the total content of the vulcanization accelerator is made smaller than the total content of the vulcanizing agent. Further, in some cases, it is considered that vulcanized rubber which has a large proportion of monosulfide bonds and disulfide bonds due to use of a thiuram-based vulcanization accelerator has an excellent heat resistance, but a lowered mechanical strength. However, in the present invention, both the softening resistance at a high temperature and the mechanical strength can be achieved. The reason for this is not clear, but it is thought that in the present invention, since as a vulcanization accelerator, a sulfenamide-based vulcanization accelerator and tetrabenzylthiuramdisulfide are contained in the above-mentioned specific amounts, it is possible to achieve both the softening resistance at a high temperature and the mechanical strength.

The mass ratio (d/c) is more preferably 0.55 to 0.95, further preferably 0.55 to 0.90, still more preferably 0.55 to 0.85 from the viewpoint of further enhancing the high-temperature softening inhibition of a tire.

(Sulfenamide-Based Vulcanization Accelerator)

Examples of the sulfenamide-based vulcanization accelerator include N-cyclohexyl-2-benzothiazolylsulfenamide, N,N-dicyclohexyl-2-benzothiazolylsulfenamide, N-tert-butyl-2-benzothiazolylsulfenamide, N-oxydiethylene-2-benzothiazolylsulfenamide, N-methyl-2-benzothiazolylsulfenamide, N-ethyl-2-benzothiazolylsulfenamide, N-propyl-2-benzothiazolylsulfenamide, N-butyl-2-benzothiazolylsulfenamide, N-pentyl-2-benzothiazolylsulfenamide, N-hexyl-2-benzothiazolylsulfenamide, N-heptyl-2-benzothiazolylsulfenamide, N-octyl-2-benzothiazolylsulfenamide, N-2-ethylhexyl-2-benzothiazolylsulfenamide, N-decyl-2-benzothiazolylsulfenamide, N-dodecyl-2-benzothiazolylsulfenamide, N-stearyl-2-benzothiazolylsulfenamide, N,N-dimethyl-2-benzothiazolylsulfenamide, N,N-diethyl-2-benzothiazolylsulfenamide, N,N-dipropyl-2-benzothiazolylsulfenamide, N,N-dibutyl-2-benzothiazolylsulfenamide, N,N-dipentyl-2-benzothiazolylsulfenamide, N,N-dihexyl-2-benzothiazolylsulfenamide, N,N-diheptyl-2-benzothiazolylsulfenamide, N,N-dioctyl-2-benzothiazolylsulfenamide, N,N-di-2-ethylhexylbenzothiazolylsulfenamide, N,N-didecyl-2- benzothiazolylsulfenamide, N,N-didodecyl-2-benzothiazolylsulfenamide, and N,N-distearyl-2-benzothiazolylsulfenamide.

As the sulfenamide-based vulcanization accelerator, one type may be used alone, or two or more types may be used.

As the sulfenamide-based vulcanization accelerator, among the above, preferred are N-cyclohexyl-2-benzothiazolylsulfenamide and N-tert-butyl-2-benzothiazolylsulfenamide, and more preferred is N-tert-butyl-2-benzothiazolylsulfenamide from the viewpoint of achieving both the softening resistance of vulcanized rubber at a high temperature and the mechanical strength, and further enhancing the run-flat durability.

The sulfenamide-based vulcanization accelerator can be freely used in a range where the above-mentioned mass ratio (a/b) is 0.60 to 1.25, but the content of the sulfenamide-based vulcanization accelerator in the rubber composition is preferably 0.80 to 3.33 parts by mass based on 100 parts by mass of the rubber component. The content of the sulfenamide-based vulcanization accelerator is more preferably 1.00 to 3.00 parts by mass based on 100 parts by mass of the rubber component, further preferably 1.10 to 2.80 parts by mass from the viewpoint of further enhancing the high-temperature softening inhibition.

The rubber composition of the present invention may further contain not only a thiuram-based vulcanization accelerator other than tetrabenzylthiuramdisulfide, but also vulcanization accelerators such as guanidine-based, aldehyde-amine-based, aldehyde-ammonia-based, thiazole-based, thiourea-based, dithiocarbamate-based, and xanthate-based accelerators.

However, in the component composition in which the total content of the vulcanization accelerator is smaller than the total content of the vulcanizing agent, from the viewpoint of increasing the proportion of monosulfide bonds and disulfide bonds, and increasing the softening resistance of vulcanized rubber at a high temperature and also enhancing the mechanical strength, it is desirable that the vulcanization accelerator is composed of tetrabenzylthiuramdisulfide and a sulfenamide-based vulcanization accelerator.

(Vulcanization Retarder)

The rubber composition of the present invention may contain a vulcanization retarder. When the rubber composition contains the vulcanization retarder, it is possible to suppress rubber burning caused by overheating of the rubber composition at the time of preparation of the rubber composition. Further, the scorch stability of the rubber composition can be improved, and the rubber composition can be easily extruded from a kneader.

The Mooney viscosity ($ML_{1+4}$, 130° C.) of the rubber composition of the present invention is preferably 40 to 100, more preferably 50 to 90, further preferably 60 to 85. When the Mooney viscosity falls within the above-mentioned range, physical properties of vulcanized rubber, including a fracture resistance property, are sufficiently obtained without impairing the production processability.

Examples of the vulcanization retarder include phthalic anhydride, benzoic acid, salicylic acid, N-nitrosodiphenylamine, N-(cyclohexylthio)-phthalimide (CTP), sulfonamide derivative, diphenylurea, and bis(tridecyl)pentaerythritoldiphosphite. As the vulcanization retarder, commercially available products may be used, and for example, "Santoguard PVI" [N-(cyclohexylthio)-phthalimide] (product name) manufactured by Monsanto may be exemplified.

Among the above, as the vulcanization retarder, N-(cyclohexylthio)-phthalimide (CTP) is preferably used.

When the vulcanization retarder is used, the content of the vulcanization retarder in the rubber composition is preferably 0.1 to 1.0 parts by mass based on 100 parts by mass of the rubber component from the viewpoint of suppressing burning of rubber of the rubber composition, and improving the scorch stability without interfering with the vulcanization reaction.

[Softener, Thermosetting Resin]

It is desirable that the rubber composition of the present invention does not substantially contain a softener and a thermosetting resin. Specifically, the content of each of the softener and the thermosetting resin is preferably 5 parts by mass or less based on 100 parts by mass of the rubber component, the total content of the softener and the thermosetting resin is more preferably 5 parts by mass or less based on 100 parts by mass of the rubber component, the total content is still more preferably 1 part by mass or less, and particularly preferably, none of the softener and the thermosetting resin are contained (the total content of the softener and the thermosetting resin is 0 parts by mass based on 100 parts by mass of the rubber component).

(Softener)

Since the rubber composition does not substantially contain a softener, the ratio of the elastic modulus of vulcanized rubber at a high temperature to the elastic modulus at a room temperature can be increased. Therefore, when the vulcanized rubber is applied to a side-reinforcing rubber of a tire, the deflection of the side wall of the tire can be suppressed. Thus, it is desirable that no softener is contained from the viewpoint of enhancing the durability during run-flat running.

Examples of the softener include process oils, and thermoplastic resins.

Examples of the process oil include mineral oil derived from minerals, aromatic oil derived from petroleum, paraffin oil, naphthenic oil, and palm oil derived from a natural product.

Examples of the thermoplastic resin include resins that are softened or are present in a liquid state at a high temperature, and then soften vulcanized rubber. Specific examples include tackifiers (not containing a curing agent) such as various petroleum-based resins such as C5-(including cyclopentadienic resin, and dicyclopentadienic resin), C9-, and C5/C9 mixed resins, terpene-based resins, terpene-aromatic compound-based resins, rosin-based resins, phenol resins, and alkylphenol resins.

(Thermosetting Resin)

Since the rubber composition does not substantially contain a thermosetting resin, vulcanized rubber becomes flexible, and the static vertical spring constant of a run-flat tire using the rubber composition of the present invention becomes small. Thus, the ride comfort of the run-flat tire is improved.

Examples of the thermosetting resin include resins such as a phenol resin, a melamine resin, a urea resin, and an epoxy resin. As the curing agent of the phenol resin, hexamethylenetetramine may be exemplified.

In addition to the components the rubber composition of the present invention may contain a compounding agent that is blended and used in a normal rubber composition. Examples thereof include various compounding agents which are usually blended, such as a vulcanization accelerator aid zinc oxide (zinc oxide), stearic acid, an antiaging agent, a compatibility agent, a workability improver, a lubricant, a tackifier, a dispersant, and a homogenizing agent.

As the antiaging agent, any known one is usable with no particular limitation, and examples include a phenol-based antiaging agent, an imidazole-based antiaging agent, and an amine-based antiaging agent. The blending amount of the antiaging agent is generally 0.5 to 10 parts by mass based on 100 parts by mass of the rubber component, preferably 1 to 5 parts by mass.

[Production Method of Rubber Composition]

As described above, the rubber composition of the present invention is obtained by kneading the above-mentioned components. The kneading method may follow the method normally carried out by those skilled in the art. At the time of kneading, a kneader such as a roll, an internal mixer, or a Banbury rotor can be used. Further, in molding into a sheet shape, a strip shape or the like, a conventionally known molding machine such as an extrusion molding machine or a press machine may be used.

For example, after all components other than sulfur, a vulcanization accelerator (and a vulcanization retarder if necessary), and zinc oxide are kneaded at 100 to 200° C., sulfur, a vulcanization accelerator, and zinc oxide (and a vulcanization retarder if necessary) may be added and then kneaded at 60 to 130° C. by using a kneading roll machine or the like.

<Run-Flat Tire>

A run-flat tire of the present invention is obtained by using the rubber composition of the present invention, for at least one member selected from the group consisting of a side-reinforcing rubber layer and a bead filler.

Hereinafter, an example of the structure of the run-flat tire having a side-reinforcing rubber layer will be described by using FIG. 1.

FIG. 1 is a schematic view illustrating a cross section of a run-flat tire according to an embodiment of the present invention, and illustrates the arrangement of each of members such as a bead filler 7, and a side-reinforcing rubber layer 8. The run-flat tire may be simply referred to as a tire.

In FIG. 1, the tire according to a preferred embodiment of the present invention is a tire that includes: a carcass layer 2 formed of at least one radial carcass ply that toroidally extends between a pair of bead cores 1 and 1' (1' is not illustrated), in which both ends of the carcass ply can be wound around the bead cores 1 from the inner side of the tire to the outside; a side rubber layer 3 that is arranged outside the side region of the carcass layer 2 in the tire axial direction to form an outside part; a tread rubber layer 4 that is arranged outside the crown region of the carcass layer 2 in the tire radial direction to form a tread part; a belt layer 5 that is arranged between the tread rubber layer 4 and the crown region of the carcass layer 2 to form a reinforcing belt; an inner liner 6 that is arranged on the entire surface of the carcass layer 2 inside the tire to form an airtight film; the bead filler 7 arranged between the main body portion of the carcass layer 2 extending from one corresponding bead core 1 to the other bead core 1' and a winding portion wound around the bead core 1; and at least one side-reinforcing rubber layer 8 between the carcass layer 2 and the inner liner 6 from the side portion of the bead filler 7 in the side region of the carcass layer to a shoulder area 10, in which the cross section taken along the tire rotation axis has substantially a crescent shape.

When the rubber composition of the present invention is used for at least one member selected from the side-reinforcing rubber layer 8 and the bead filler 7, the run-flat tire of the present invention is excellent in the high-temperature softening inhibition, and as a result, is excellent in the run-flat durability. The vulcanized rubber of the rubber composition of the present invention may be used for portions other than the bead filler 7 and the side-reinforcing rubber layer 8, for example, the tread rubber layer 4 or the like.

The carcass layer 2 of the tire of the present invention is formed of at least one carcass ply, but may have two or more carcass plies. Further, reinforcing cords of the carcass ply may be arranged at an angle of substantially 90° to the peripheral direction of the tire, and the number of reinforcing cords to be driven in may be 35 to 65 cords/50 mm. Further, the belt layer 5 composed of two layers of a first belt layer 5a and a second belt layer 5b is provided outside the crown region of the carcass layer 2 in the tire radial direction, but the number of the belt layers 5 is not limited thereto. As the first belt layer 5a and the second belt layer 5b, belt layers in which plural steel cords aligned in parallel in the tire width direction without being twisted and are buried in the rubber can be used. For example, the first belt layer 5a and the second belt layer 5b may be arranged so as to cross each other between layers to form crossed belts.

Further, in the tire of the present invention, a belt-reinforcing layer (not illustrated) may be arranged outside the belt layer 5 in the tire radial direction. As the reinforcing cord of the belt-reinforcing layer, a cord composed of organic fibers having high elasticity is preferably used for the purpose of securing the tensile stiffness in the tire peripheral direction. The organic fiber cord may be those of organic fiber cords such as aromatic polyamide (aramid), polyethylene naphthalate (PEN), polyethylene terephthalate, rayon, zylon (registered trademark) (polyparaphenylene benzobisoxazole (PBO) fiber), and aliphatic polyamide (nylon).

Further, in the tire of the present invention, although not illustrated, any other reinforcing members such as an insert or a flipper may be arranged in addition to the side-reinforcing layer. Here, the insert is a reinforcing material (not illustrated) arranged in the tire peripheral direction from the bead portion to the side portion, in which highly elastic organic fiber cords are arranged and coated with rubber. The flipper is a reinforcing material provided between the main body portion of the carcass ply extending between the bead cores 1 or 1' and a folded part folded around the bead core 1 or 1', which includes, therein, at least a part of the bead core 1 or 1' and the bead filler 7 arranged on the outer side thereof in the tire radial direction. In the flipper, highly elastic organic fiber cords are arranged and coated with rubber. The angle of the insert and the flipper is preferably 30 to 60° to the peripheral direction.

In a pair of bead portions, each of the bead cores 1 and 1' is buried, and the carcass layer 2 is locked as folded from inside to outside the tire around the bead cores 1 and 1' but the locking method for the carcass layer 2 is also not limited thereto. For example, at least one carcass ply among carcass plies constituting the carcass layer 2 may be folded from inside toward outside in the tire width direction around the bead cores 1 and 1' and the folded end may be located between the belt layer 5 and the crown region of the carcass layer 2 so as to form a so-called envelop structure. Further, a tread pattern may be appropriately formed on the surface of the tread rubber layer 4, and the inner liner 6 may be formed on the innermost layer. In the tire of the present invention, the gas to be filled into the tire may be ordinary air or air having a changed oxygen partial pressure, or inert gas such as nitrogen.

(Production Method of Run-Flat Tire)

The run-flat tire of the present invention is produced by a usual method of producing a run-flat tire by using the vulcanized rubber of the rubber composition of the present invention, in either or both of the bead filler 7 and the side-reinforcing rubber layer 8.

That is, in a stage where the rubber composition containing various chemicals is unvulcanized, the rubber composition is processed into each member, and is paste-molded on a tire molding machine by an ordinary method, and then is molded into a green tire. This green tire is heated and pressurized within a vulcanizing machine to obtain a run-flat tire.

EXAMPLE

Examples 1 to 5, Comparative Examples 1 to 7

[Preparation of Rubber Composition]

Rubber compositions of Examples 1 and 3 to 5, and Comparative Examples 1 to 7 were prepared by kneading the components according to compounding compositions noted in Tables 1 and 2 below. Further, a rubber composition of Example 2 is prepared by kneading the components according to a compounding composition noted in Table 1.

Comparative Example 4 noted in Table 1 and Comparative Example 6 noted in Table 2 have the same rubber composition contents but are different in vulcanized rubber used for evaluation of rupture characteristics (EB×TB) to be described below, and a tire size used for evaluation of run-flat durability. Thus, different numbers are applied thereto.

The modified polybutadiene rubber used for preparing the rubber compositions of Examples 1, and 3 to 5, and Comparative Examples 1 to 7, and the modified polybutadiene rubber used for preparing the rubber composition of Example 2 were produced by the following method.

[Production of Primary Amine-Modified Polybutadiene Rubber P]

(1) Production of Unmodified Polybutadiene

Under nitrogen, a cyclohexane solution of 1.4 kg of cyclohexane, 250 g of 1,3-butadiene and 2,2-ditetrahydrofurylpropane (0.285 mmol) was injected into a nitrogen-purged 5-L autoclave, and 2.85 mmol of n-butyllithium (BuLi) was added thereto and subjected to polymerization for 4.5 h in a hot water bath set at 50° C. and equipped with a stirrer. The reaction conversion of 1,3-butadiene was almost 100%. A part of the polymer solution was taken out and put into a methanol solution containing 1.3 g of 2,6-di-tert-butyl-p-cresol to stop the polymerization. Then the solvent was removed by steam stripping, and the residue was dried with a roll at 110° C. to give unmodified polybutadiene. On the obtained unmodified polybutadiene, the micro structure (vinyl bond content) was measured, and as a result, the vinyl bond content was 30% by mass.

(2) Production of Primary Amine-Modified Polybutadiene Rubber P

The polymer solution obtained in the above (1) was kept at a temperature of 50° C. without deactivation of the polymerization catalyst, and 1129 mg (3.364 mmol) of N,N-bis(trimethylsilyl)aminopropylmethyldiethoxysilane in which the primary amino group was protected was added thereto to attain a modification reaction for 15 min.

Subsequently, 8.11 g of a condensation accelerator tetrakis(2-ethyl-1,3-hexanedioleate)titanium was added, and further stirred for 15 min.

Finally, after the reaction, 242 mg of silicon tetrachloride as a metal halide compound was added to the polymer solution, and 2,6-di-tert-butyl-p-cresol was added. Next, the solvent was removed and the protected primary amino group was deprotected by steam stripping, and then, the rubber was dried with a hot roll whose temperature was adjusted to 110° C. to give a primary amine-modified polybutadiene rubber P.

The resultant modified polybutadiene was analyzed for the microstructure (vinyl bond amount), resulting in that the vinyl bond amount was 30% by mass.

Further, details of each component other than the modified polybutadiene rubber (the primary amine-modified polybutadiene rubber P) are as follows.

(1) Rubber Component

Natural rubber: RSS #1

(2) Filler

Carbon black 1: manufactured by Asahi Carbon, product name "Asahi #52"

[nitrogen adsorption method specific surface area 28 m²/g, DBP oil absorption amount 128 ml/100 g, toluene coloring transmission=65%]

Carbon black 2: manufactured by Asahi Carbon, product name "Asahi #60"

[nitrogen adsorption method specific surface area 40 m²/g, DBP oil absorption amount 114 ml/100 g, toluene coloring transmission=80%]

Carbon black 3: manufactured by Tokai Carbon, product name "Seast FY"

[nitrogen adsorption method specific surface area 29 m²/g, DBP oil absorption amount 152 ml/100 g, toluene coloring transmission=80%]

Carbon black 4: manufactured by Cabot, product name "SP5000A"

[nitrogen adsorption method specific surface area 28 m²/g, DBP oil absorption amount 120 ml/100 g, toluene coloring transmission=99%]

(3) Resin

Thermosetting resin: phenol resin, manufactured by Sumitomo Bakelite, product name "SMILITERESIN PR-50731"

Curing agent: hexamethoxymethylmelamine, manufactured by Fujifilm Wako Pure Chemical (4) Vulcanization Accelerator, Vulcanizing Agent, Vulcanization Retarder Vulcanization accelerator 1 (TOT): tetrakis(2-ethylhexyl)thiuramdisulfide, manufactured by Ouchi Shinko Chemical Industrial, product name "Nocceler TOT-N"

Vulcanization accelerator 2 (TBzTD): tetrabenzylthiuramdisulfide, manufactured by Sanshin Chemical Industry, product name "Sanceler TBzTD"

Vulcanization accelerator 3 (NS): N-t-butyl-2-benzothiazolesulfenamide, manufactured by Ouchi Shinko Chemical Industrial, product name "Nocceler NS"

Vulcanization retarder (PVI): manufactured by Monsanto, product name "Santoguard PVI" [N-(cyclohexylthio)-phthalimide]

Sulfur: manufactured by Tsurumi Chemical Industry, product name "powdered sulfur"

(5) Various Components

Stearic acid: manufactured by New Japan Chemical, product name "stearic acid 505"

Zinc oxide: manufactured by Hakusui Tech, product name "No. 3 zinc oxide"

Antiaging agent (6C): N-phenyl-N'-(1,3-dimethylbutyl)-p-phenylenediamine, manufactured by Ouchi Shinko Chemical Industrial, product name "Nocrac 6C"

[Production of Run-Flat Tire, and Measurement and Evaluation of Physical Properties of Vulcanized Rubber]

(A) Production of Tire of Size A

The obtained rubber composition was prepared for the side-reinforcing rubber layer 8 and the bead filler 7 illustrated in FIG. 1, and each radial run-flat tire for a passenger car with a tire size 255/65F18 (size A) was produced according to a conventional method. In the prototype tires, the maximum thickness of the side-reinforcing rubber layer was 14.0 mm, and all the side-reinforcing rubber layers were formed into the same shape.

(B) Production of Tire of Size B

The obtained rubber composition was prepared for the side-reinforcing rubber layer 8 and the bead filler 7 illustrated in FIG. 1, and each radial run-flat tire for a passenger car with a tire size 235/65R17 (size B) was produced according to a conventional method. In the prototype tires, the maximum thickness of the side-reinforcing rubber layer was 11.8 mm, and all the side-reinforcing rubber layers were formed into the same shape.

1. High-Temperature Softening Degree

The dynamic tensile storage modulus E' of vulcanized rubber obtained by vulcanizing the rubber composition of Examples 1, and 3 to 5, and Comparative Examples 1 to 7 was measured over 25° C. to 180° C. under conditions that the initial tensile strain was 5%, the dynamic tensile strain was 1%, and the frequency was 52 Hz. A difference ($\Delta E'=E'_{max}-E'_{180°\,C.}$) between the maximum value ($E'_{max}$) of the dynamic tensile storage modulus E' and the dynamic tensile storage modulus E' at 180° C. ($E'_{180°\,C.}$) was calculated as a high-temperature softening degree. 1.000 was set for the high-temperature softening degree ΔE' of Comparative Example 1, and then an index was obtained for the high-temperature softening degree ΔE' of each of Examples and Comparative Examples noted in Tables 1 and 2. The smaller the high-temperature softening degree ΔE', the more difficult it is for the vulcanized rubber to soften at a high temperature. This means that the mechanical strength is maintained.

The evaluation on the high-temperature softening degree of Example 2 is performed in the following manner.

The dynamic tensile storage modulus E' of vulcanized rubber obtained by vulcanizing the rubber composition is measured over 25° C. to 180° C. under conditions that the initial tensile strain is 5%, the dynamic tensile strain is 1%, and the frequency is 52 Hz. A difference (ΔE=E'max−E'180° C.) between the maximum value (E'max) of the dynamic tensile storage modulus E' and the dynamic tensile storage modulus E' at 180° C. (E'180° C.) is calculated as the high-temperature softening degree. 1.000 is set for the high-temperature softening degree 4E' of Comparative Example 1, and then an index is obtained for the high-temperature softening degree 4E'. The smaller the high-temperature softening degree 4E', the more difficult it is for the vulcanized rubber to soften at a high temperature. This means that the mechanical strength is maintained.

2. Run-Flat Durability

In Examples 1, 4, and 5 and Comparative Examples 2 to 4 in Table 1, the prototype tires of size A were used, and in Comparative Examples 6 and 7 in Table 2, the prototype tires of size B were used. Then, in a state where the internal pressure was not charged, drum running (speed 80 km/h) was carried out, and then the drum running distance until the tire could not run was set as a run-flat running distance.

In Table 1 (Examples 1, 4, and 5 and Comparative Examples 2 to 4), indices were expressed when 100 was set for the run-flat running distance of the run-flat tire of Comparative Example 4, and in Table 2 (Comparative Examples 6 and 7), indices were expressed when 100 was set for the run-flat running distance of the run-flat tire of Comparative Example 6. The larger the index, the more excellent the run-flat durability of the run-flat tire.

In Example 2, Example 3, Comparative Example 1 and Comparative Example 5, the run-flat durability evaluation was not performed.

3. Rupture Characteristics (EB×TB)

In Examples 1, and 3 to 5 and Comparative Examples 1 to 5 in Table 1, vulcanized rubber was produced under vulcanization conditions of 145° C., and 26 min. In Comparative Examples 6 and 7 in Table 2, vulcanized rubber was produced under vulcanization conditions of 160° C., and 12 min. Each vulcanized rubber was processed into a No. 8 dumbbell-shaped test piece, and the breaking elongation (EB) and the tensile strength (TB) were obtained by using a tensile test device (Shimadzu Corporation).

The test piece was pulled at 25° C. at a speed of 100 mm/min, and the length when the test piece broke was measured. Then, the breaking elongation (EB) was obtained as the length (unit: %) relative to the length (100%) prior to pulling.

The test piece was pulled at 25° C. at a specified speed (500±25 mm/min) until the test piece broke, and on the basis of JIS K 6251 (2017), the tensile strength (TB) was obtained as the maximum tensile force (unit: MPa) required for breaking.

The breaking elongation (EB) (%) and the tensile strength (TB) (MPa) obtained from each of Examples and Comparative Examples were multiplied to calculate EB×TB.

In Table 1 (Examples 1, and 3 to 5 and Comparative Examples 1 to 5), indices were expressed for the EB×TB value when 100 was set for the EB×TB value of Comparative Example 4. In Table 2 (Comparative Examples 6 and 7), indices were expressed for the EB×TB value when 100 was set for the EB×TB value of Comparative Example 6. The larger the index, the more excellent the rupture characteristics of the vulcanized rubber.

In Example 2 of Table 1, vulcanized rubber is produced under vulcanization conditions of 145° C., and 26 min. Each vulcanized rubber is processed into a No. 8 dumbbell-shaped test piece, and the breaking elongation (EB) and the tensile strength (TB) are obtained by using a tensile test device (Shimadzu Corporation).

The test piece is pulled at 25° C. at a speed of 100 mm/min, and the length when the test piece broke is measured. Then, the breaking elongation (EB) is obtained as the length (unit: %) relative to the length (100%) prior to pulling.

The test piece is pulled at 25° C. at a specified speed (500±25 mm/min) until the test piece broke, and on the basis of JIS K 6251 (2017), the tensile strength (TB) is obtained as the maximum tensile force (unit: MPa) required for breaking.

The breaking elongation (EB)(%) and the tensile strength (TB)(MPa) are multiplied to calculate EB×TB.

An index is expressed for the EB×TB value when 100 was set for the EB×TB value of Comparative Example 4. The larger the index, the more excellent the rupture characteristics of the vulcanized rubber.

TABLE 1

| Rubber composition | | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|
| Natural Rubber | part | 50 | 50 | 50 | 50 | 50 | 50 | 30 | 30 | 30 | 50 |
| Modified butadiene rubber | part | 50 | 50 | 50 | 50 | 50 | 50 | 70 | 70 | 70 | 50 |
| Carbon black 1 | part | 60 | 60 | 60 | 0 | 0 | 60 | 0 | 0 | 0 | 60 |
| Carbon black 2 | part | 0 | 0 | 0 | 0 | 0 | 0 | 60 | 60 | 60 | 0 |
| Carbon black 3 | part | 0 | 0 | 0 | 50 | 0 | 0 | 0 | 0 | 0 | 0 |
| Carbon black 4 | part | 0 | 0 | 0 | 0 | 60 | 0 | 0 | 0 | 0 | 0 |
| Thermosetting resin | part | 0 | 0 | 0 | 0 | 0 | 0 | 2.50 | 2.50 | 1.25 | 0.00 |
| Curing agent | part | 0 | 0 | 0 | 0 | 0 | 0 | 0.25 | 0.25 | 0.12 | 0.00 |
| Stearic Acid | part | 1 | 1 | 1 | 1 | 1 | 1 | 1 | 1 | 1 | 1 |
| Zinc oxide | part | 5 | 5 | 5 | 5 | 5 | 5 | 5 | 5 | 5 | 5 |
| Antiaging agent (6C) | part | 2.70 | 2.70 | 2.70 | 2.70 | 3.70 | 2.70 | 2.70 | 2.70 | 2.70 | 2.70 |
| Vulcanization accelerator 1 (TOT) | part | 0.00 | 0.00 | 0.00 | 0.00 | 0.00 | 1.55 | 1.00 | 1.80 | 1.80 | 0.00 |
| Vulcanization accelerator 2 (TBzTD) (a) | part | 1.55 | 1.55 | 1.55 | 1.55 | 1.55 | 0.00 | 0.00 | 0.00 | 0.00 | 0.80 |
| Vulcanization accelerator 3 (NS) (b) | part | 2.00 | 2.40 | 1.30 | 2.00 | 2.00 | 2.00 | 3.30 | 3.30 | 3.30 | 2.00 |
| Total of vulcanization accelerators (d) | part | 3.55 | 3.95 | 2.85 | 3.55 | 3.55 | 3.55 | 4.30 | 5.10 | 5.10 | 4.80 |
| Vulcanization retarder (PVI) | part | 0.60 | 0.60 | 0.60 | 0.60 | 0.60 | 0.60 | 0.50 | 0.50 | 0.50 | 0.50 |
| Sulfur (c) | part | 5.0 | 5.0 | 5.0 | 5.0 | 5.0 | 5.0 | 5.5 | 5.5 | 5.5 | 5.0 |
| Ratio (a/b) | — | 0.78 | 0.65 | 1.19 | 0.78 | 0.78 | 0.00 | 0.00 | 0.00 | 0.00 | 0.00 |
| Ratio (a/c) | — | 0.310 | 0.310 | 0.310 | 0.310 | 0.310 | 0.00 | 0.00 | 0.00 | 0.00 | 0.00 |
| Ratio (d/c) | — | 0.710 | 0.790 | 0.570 | 0.710 | 0.710 | 0.710 | 0.782 | 0.927 | 0.927 | 0.960 |
| Rupture Characteristics (EB × TB) | — | 162 | 130 | 118 | 135 | 145 | 178 | 115 | 99 | 100 | 166 |
| High-Temperature Softening Degree | — | 0.18 | 0.23 | 0.19 | 0.19 | 0.20 | 0.90 | 1.10 | 1.00 | 0.66 | 0.60 |
| Run-Flat Durability | — | 110 | — | — | 110 | 110 | — | 75 | 80 | 100 | — |

TABLE 2

| Rubber composition | | Comparative Example 6 | Comparative Example 7 |
|---|---|---|---|
| Natural Rubber | part | 30 | 30 |
| Modified butadiene rubber | part | 70 | 70 |
| Carbon black 1 | part | 0 | 0 |
| Carbon black 2 | part | 60 | 60 |
| Carbon black 3 | part | 0 | 0 |
| Carbon black 4 | part | 0 | 0 |
| Thermosetting resin | part | 1.25 | 2.50 |
| Curing agent | part | 0.12 | 0.25 |
| Stearic Acid | part | 1 | 1 |
| Zinc oxide | part | 5 | 5 |
| Antiaging agent (6C) | part | 2.70 | 2.70 |
| Vulcanization accelerator 1 (TOT) | part | 1.80 | 0.00 |
| Vulcanization accelerator 2 (TBzTD) (a) | part | 0.00 | 0.00 |
| Vulcanization accelerator 3 (NS) (b) | part | 3.00 | 3.62 |
| Total of vulcanization accelerators (d) | part | 4.80 | 3.62 |
| Vulcanization retarder (PVI) | part | 0.50 | 0.50 |
| Sulfur (c) | part | 5.5 | 7.5 |
| Ratio (a/b) | — | 0.00 | 0.000 |
| Ratio (a/c) | — | 0.00 | 0.000 |
| Ratio (d/c) | — | 0.873 | 0.483 |
| Rupture characteristics (EB × TB) | — | 100 | 91 |
| High-temperature softening degree | — | 0.66 | 1.20 |
| Run-flat durability | — | 100 | 70 |

From Tables 1 and 2, it can be found that vulcanized rubber of the rubber composition of the present invention has a low high-temperature softening degree as compared to that in Comparative Example, in which in the rubber composition of the present invention, the content of the vulcanization accelerator 2 (tetrabenzylthiuramdisulfide) is 1.0 to 2.0 parts by mass based on 100 parts by mass of the rubber component, and the ratio (a/b) is 0.60 to 1.25. From this, it can be found that the vulcanized rubber of the rubber composition of the present invention is hardly softened at a high temperature, and then the mechanical strength is maintained. Further, since the run-flat durability indices of Examples 1, 4 and 5 are greater than 100, it can be found that a tire using vulcanized rubber with a low high-temperature softening degree is excellent in the run-flat durability.

INDUSTRIAL APPLICABILITY

The vulcanized rubber of the rubber composition of the present invention is hardly softened at a high temperature and also has an excellent mechanical strength, and thus is suitably used for a side-reinforcing rubber and a bead filler of various tires, especially, a run-flat tire.

REFERENCE SIGNS LIST

1 Bead Core
2 Carcass Layer
3 Side Rubber Layer

4 Tread Rubber Layer
5 Belt Layer
7 Inner Liner
8 Bead Filler
9 Side-Reinforcing Rubber Layer
10 Shoulder Area

The invention claimed is:

1. A run-flat tire comprising a rubber composition, the rubber composition comprising:
    a rubber component;
    a filler;
    a vulcanizing agent; and
    a vulcanization accelerator containing a sulfenamide-based vulcanization accelerator and 1.0 to 2.0 parts by mass of tetrabenzylthiuramdisulfide based on 100 parts by mass of the rubber component, in which a mass ratio (a/b) of a content (a) of the tetrabenzylthiuramdisulfide to a content (b) of the sulfenamide-based vulcanization accelerator is 0.60 to 1.25,
    wherein the filler contains carbon black having a DBP oil absorption amount of 120 to 180 mL/100 g,
    wherein the rubber composition is used for at least one member selected from the group consisting of a side-reinforcing rubber layer and a bead filler, and
    wherein a mass ratio (d/c) of a total content (d) of the vulcanization accelerator to a total content (c) of the vulcanizing agent is 0.55 to 0.99.

2. The run-flat tire according to claim 1, wherein a mass ratio (a/c) of the content (a) of the tetrabenzylthiuramdisulfide to a content (c) of the vulcanizing agent is 0.22 to 0.32.

3. The run-flat tire according to claim 1, wherein a total content of the vulcanization accelerator is smaller than a total content of the vulcanizing agent.

4. The run-flat tire according to claim 1, wherein the filler contains carbon black having a nitrogen adsorption specific surface area of 15 to 39 $m^2/g$.

5. The run-flat tire according to claim 1, wherein a total content of a softener and a thermosetting resin is 5 parts by mass or less based on 100 parts by mass of the rubber component.

6. The run-flat tire according to claim 1, wherein a total content of a softener and a thermosetting resin is 1 part by mass or less based on 100 parts by mass of the rubber component.

7. The run-flat tire according to claim 2, wherein a total content of the vulcanization accelerator is smaller than a total content of the vulcanizing agent.

8. The run-flat tire according to claim 2, wherein the filler contains carbon black having a nitrogen adsorption specific surface area of 15 to 39 $m^2/g$.

9. The run-flat tire according to claim 2, wherein a total content of a softener and a thermosetting resin is 5 parts by mass or less based on 100 parts by mass of the rubber component.

10. The run-flat tire according to claim 2, wherein a total content of a softener and a thermosetting resin is 1 part by mass or less based on 100 parts by mass of the rubber component.

11. The run-flat tire according to claim 3, wherein the filler contains carbon black having a nitrogen adsorption specific surface area of 15 to 39 $m^2/g$.

12. The run-flat tire according to claim 3, wherein a total content of a softener and a thermosetting resin is 5 parts by mass or less based on 100 parts by mass of the rubber component.

* * * * *